US009350687B2

(12) United States Patent
Jones et al.

(10) Patent No.: US 9,350,687 B2
(45) Date of Patent: May 24, 2016

(54) INSTANT MESSAGING TRANSCRIPT SHARING FOR ADDED PARTICIPANTS TO AN INSTANT MESSAGING SESSION

(75) Inventors: Angela Richards Jones, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1345 days.

(21) Appl. No.: 11/967,741

(22) Filed: Dec. 31, 2007

(65) Prior Publication Data

US 2009/0172111 A1 Jul. 2, 2009

(51) Int. Cl.
*G06F 15/16* (2006.01)
*H04L 12/58* (2006.01)
*H04L 12/18* (2006.01)

(52) U.S. Cl.
CPC ............. *H04L 51/04* (2013.01); *H04L 12/1822* (2013.01)

(58) Field of Classification Search
USPC .................................................. 709/204–207
See application file for complete search history.

(56) References Cited

U.S. PATENT DOCUMENTS

| 7,194,536 | B2 * | 3/2007 | Fellenstein et al. | 709/224 |
| 2005/0235034 | A1 * | 10/2005 | Chen et al. | 709/206 |
| 2005/0262199 | A1 * | 11/2005 | Chen et al. | 709/204 |
| 2006/0155785 | A1 * | 7/2006 | Berry et al. | 707/204 |
| 2006/0211404 | A1 * | 9/2006 | Cromp et al. | 455/405 |
| 2007/0168448 | A1 * | 7/2007 | Garbow et al. | 709/207 |
| 2007/0168863 | A1 * | 7/2007 | Blattner et al. | 715/706 |
| 2008/0144784 | A1 * | 6/2008 | Limberg | 379/88.14 |
| 2008/0256190 | A1 * | 10/2008 | Ryan et al. | 709/206 |
| 2009/0019377 | A1 * | 1/2009 | Chen et al. | 715/758 |
| 2009/0030984 | A1 * | 1/2009 | Chen et al. | 709/204 |
| 2009/0125477 | A1 * | 5/2009 | Lu et al. | 707/1 |

* cited by examiner

*Primary Examiner* — Abdullahi E Salad

(74) *Attorney, Agent, or Firm* — Steven M. Greenberg, Esq.; CRGO Law

(57) ABSTRACT

Embodiments of the present invention address deficiencies of the art in respect to instant messaging and provide a method, system and computer program product for instant messaging transcript sharing for added participants to an instant messaging session. In one embodiment of the invention, a method for instant messaging transcript sharing for added participants to an instant messaging session can be provided. The method can include establishing an instant messaging session as between a set of initial parties, aggregating postings from the initial parties into a transcript, adding a new party to the instant messaging session, and sharing at least a portion of the transcript in a transcript view for the new party. Optionally, an ability of the new party to log shared portions of the transcript can be limited or prohibited.

18 Claims, 1 Drawing Sheet

INSTANT MESSAGING TRANSCRIPT SHARING FOR ADDED PARTICIPANTS TO AN INSTANT MESSAGING SESSION

BACKGROUND OF THE INVENTION

1. Field of the Invention

The present invention relates to the field of instant messaging and more particularly to the addition of participants to an ongoing instant messaging session.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include document libraries, instant messaging, chat rooms, and application sharing.

Conventional collaborative computing includes combinations of collaborative technologies in order to provide a means for members of a collaborative community to pool their strengths and experiences to achieve a common goal. A collaborative computing community generally can be defined by (1) a particular context, i.e. the objective of the environment, (2) membership, i.e., the participants in the environment, (3) a set of roles for the members, and (4) resources and tools which can be accessed by the membership in furtherance of the objective of the environment. Roles are names given to the people in the environment which dictate access to the resources and tools within the environment as well as define the behavior of the community members.

Amongst often used collaborative components in a collaborative environment, instant messaging remains of paramount importance. In an instant messaging environment, one or more collaborators can exchange messages shown to be arranged in a single space visible by all. Thus, the instant messaging component aims to mimic a human-to-human conversation in which the real-time nature of the exchange of written conversation between participants can be limited only by the speed in which participants can read, digest and reply to the contributions of other contributors who are party to the instant messaging session.

In many cases, an instant messaging session involves two parties to an instant messaging session. As a party posts an instant messaging to the instant messaging session, the posting can appear in a common view of the conversation visible as a transcript to each of the parties. During the course of a given instant messaging session, either party to the instant messaging session can invite a third party to join the instant messaging session. The ability to add additional parties to an ongoing instant messaging session can be important just in the same way it can be important to involve additional persons in a face to face conversation as important issues implicating additional persons arise in the course of the face to face conversation.

When adding new parties to an ongoing instant messaging session, the newly added parties receive a common view to the instant messaging session—namely the transcript. Yet, the transcript visible in the instant messaging client for the added party reflects only those postings which occur subsequent to the added party joining the instant messaging session. All prior postings are omitted from the transcript for the added party. It will be recognized, however, that omitting postings from the transcript occurring prior to the addition of the added party can result in the newly added party lacking context necessary to adequately participate in the instant messaging session.

BRIEF SUMMARY OF THE INVENTION

Embodiments of the present invention address deficiencies of the art in respect to instant messaging and provide a novel and non-obvious method, system and computer program product for instant messaging transcript sharing for added participants to an instant messaging session. In one embodiment of the invention, a method for instant messaging transcript sharing for added participants to an instant messaging session can be provided. The method can include establishing an instant messaging session as between a set of initial parties, aggregating postings from the initial parties into a transcript, adding a new party to the instant messaging session, and sharing at least a portion of the transcript in a transcript view for the new party. Optionally, an ability of the new party to log shared portions of the transcript can be limited or prohibited.

In another embodiment of the invention, an instant messaging data processing system can be provided. The system can include an instant messaging server configured for communicative coupling to instant messaging clients over a computer communications network. The system also can include transcript sharing logic coupled to at least one of the instant messaging server and the instant messaging clients. The logic can include program code enabled to aggregating postings from initial parties to an instant messaging session into a transcript, and to share at least a portion of the transcript in a transcript view for a new party added to the instant messaging session. Optionally, the transcript sharing logic can be disposed in the instant messaging server or in each of the instant messaging clients.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for instant messaging transcript sharing for added participants to an instant messaging session. In accordance with an embodiment of the present invention, an instant messaging session can be established as between two or more initial parties contributing postings to a transcript for the instant messaging session through respective instant messaging clients. Thereafter, a new party can be added to the instant messaging session. In consequence, at least a portion of the transcript can be provided to the new party for viewing. The portion provided can be determined manually by the initial party directing the addition of the new party, by an administrator for the instant messaging session, or according to established rules.

Figure 1:
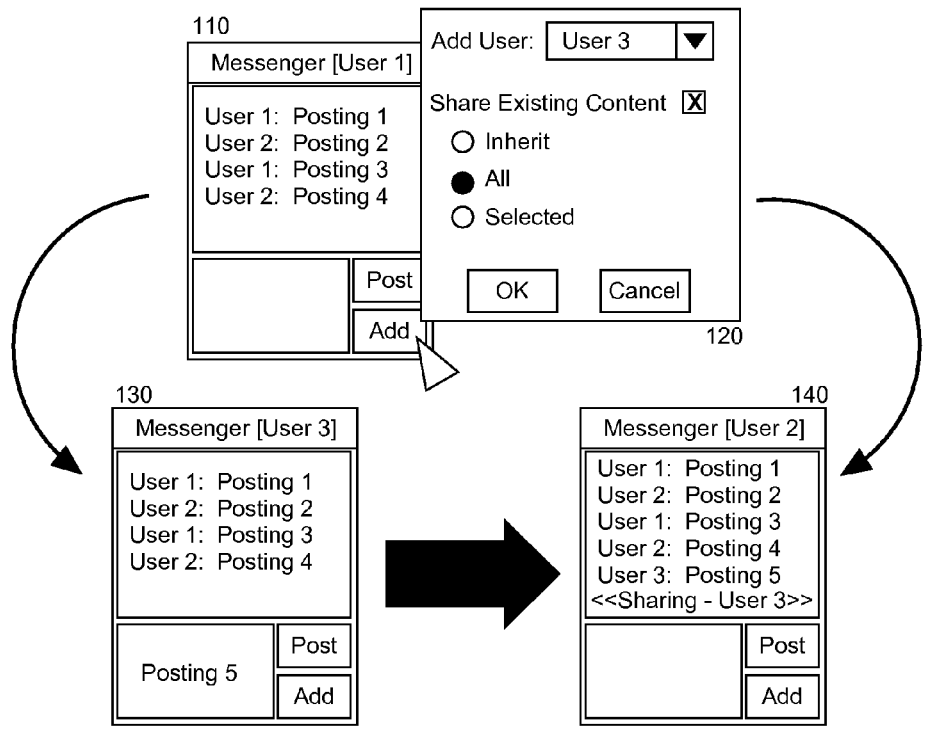
FIG. 1 is a pictorial illustration of a process for instant messaging transcript sharing for added participants to an instant messaging session.

In further illustration, FIG. 1 pictorially depicts a process for instant messaging transcript sharing for added participants to an instant messaging session. As shown in FIG. 1, an instant messaging session can be established as between an initial set of parties. Each party can provide postings to the instant messaging session through a respective instant messaging client 110. The postings by the initial parties to the instant messaging session can be reflected in a transcript common for the initial parties in each respective instant messaging client 110. Notably, the instant messaging client 110 can provide a user interface control for adding a new party to the instant messaging session.

Responsive to the activation of the user interface control for adding a new party to the instant messaging session, an add user dialog 120 can be provided. Aside from identifying the party or parties to be invited to join the instant messaging session, the add user dialog 120 further can provide controls to determine whether or not to share existing portions of the transcript for the instant messaging session with the newly invited party or parties. In this regard, the entirety of the transcript can be shared, a selected portion of the transcript can be shared, or the decision can defer to the rights provided to the moderator for the instant messaging session.

Once a new party has been invited to join the instant messaging session (and presuming that the new party has accepted the invitation), an instant messaging client 130 can be provided to the new party. The instant messaging client 130 can permit the new party to post messages to the instant messaging session. Additionally, the transcript rendered within the instant messaging client 130 can reflect not only postings occurring subsequent to the new party having joined the instant messaging session, but also postings in the transcript provided prior to the new party joining the instant messaging session. The extent of the prior postings provided in the instant messaging client 130 can depend upon the controls selected in the add user dialog 120.

Once the new party has joined the instant messaging session, the instant messaging clients 140 of the initial set of parties can reflect the postings of the new party. Additionally, an indication can be provided in the instant messaging clients 140 that some or all of the postings existing prior to the new party joining the instant messaging session have been shared with the new party. Optionally, the instant messaging client 130 for the new party can permit the logging not only of the postings provided subsequent to the new party joining the instant messaging session, but also those prior posting provided in the instant messaging client 130 depending upon security rights specified at the time of inviting the new party to the instant messaging session.

Figure 2:
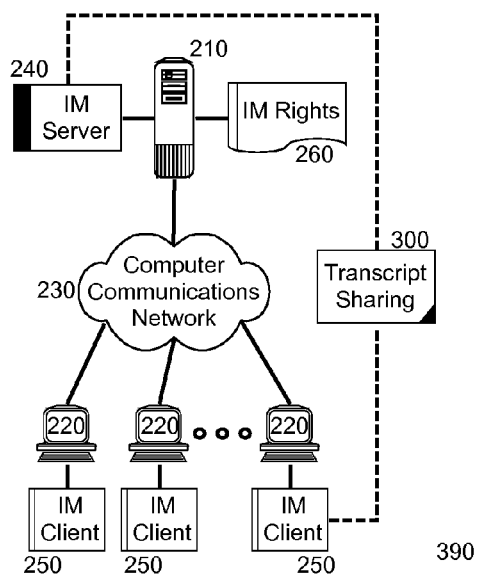
FIG. 2 is a schematic illustration of an instant messaging data processing system configured for instant messaging transcript sharing for added participants to an instant messaging session; and, FIG. 3 is a flow chart illustrating a process for instant messaging transcript sharing for added participants to an instant messaging session.

The process shown in FIG. 1 can be implemented in an instant messaging data processing system. In illustration, FIG. 2 schematically depicts an instant messaging data processing system configured for instant messaging transcript sharing for added participants to an instant messaging session. The system can include a host server 210 communicatively coupled to multiple different computing devices 220 over computer communications network 230. The host server 210 can support the operation of an instant messaging server 240 providing instant messaging services to different instant messaging clients 250 corresponding individually to different ones of the computing devices 220.

Importantly, transcript sharing logic 300 can be coupled to the instant messaging clients 250 and the instant messaging server 240. The logic 300 can include program code enabled to share transcript portions for an existing instant messaging session with a newly added party to the instant messaging session. The portions of an existing transcript shared can depend upon manual settings by an inviting party to the instant messaging session, a set of instant messaging rights 260 set forth expressly or by inheritance in connection with the instant messaging session, or both. The program code of the logic 300 further can be enabled to manage logging by the newly added party of the portions of the existing transcript again depending upon the set of instant messaging rights 260 set forth expressly or by inheritance in connection with the instant messaging session, or both.

Figure 3:
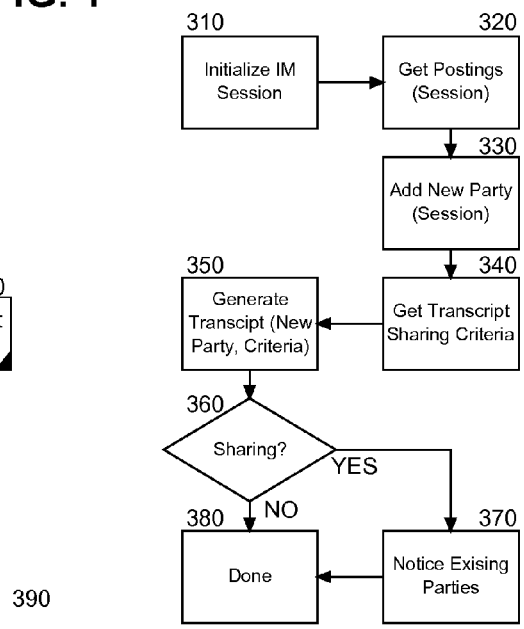

In yet further illustration of the operation of the transcript sharing logic 300, FIG. 3 is a flow chart illustrating a process for instant messaging transcript sharing for added participants to an instant messaging session. Beginning in block 310, an instant messaging session can be initialized and in block 320, postings can be accepted for the session from a set of initial parties to the instant messaging session. In block 330, a new party can be added to the instant messaging session. Prior to rendering a transcript view in an instant messaging client for the newly added party, however, transcript sharing criteria can be consulted.

The transcript sharing criteria can be set forth manually at the time of inviting the new party, automatically according to rules, or both. The transcript sharing criteria can specify whether all, a portion or none of the transcript is to be shared in the transcript view for the newly added party. The transcript sharing criteria further can specify whether or not the newly added party is permitted to log postings from shared portions of the transcript existing prior to the addition of the new party to the instant messaging session. Examples include being permitted only to view the postings, to view and log the postings, to view the postings and log only the textual portions and not audio portions of the postings, or to inherit the rights of the inviting party.

Thereafter, in block 350 the transcript view can be generated for the newly added party to the instant messaging session. In this regard, the transcript view can be provided within the instant messaging client for the newly added party, or the transcript view can be provided in a separate view from the instant messaging client for the newly added party. In decision block 360, if sharing of any of the postings is permitted, then in block 370 notice can be provided to the set of initial parties to the instant messaging session as well. In either case, the process can end in block 380.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for instant messaging transcript sharing for added participants to an instant messaging session, the method comprising:
   establishing an instant messaging session as between a set of initial parties by an instant messaging server executing in memory of a computer;
   aggregating postings from the initial parties into a transcript;
   presenting in a user interface to the instant messaging session an add user dialog comprising controls selectable to determine whether or not to share the entire transcript or only a portion of the transcript with a newly added party to the instant messaging session;
   adding a new party to the instant messaging session through the instant messaging server; and,
   sharing only a portion of the transcript in a transcript view for the new party if the controls are selected to share the portion of the transcript, and sharing the entire portion of the transcript in the transcript view for the new party if the controls are selected to share the entire transcript.

2. The method of claim 1, further comprising limiting an ability of the new party to log shared portions of the transcript after the new party has been added to the instant messaging session.

3. The method of claim 1, further comprising prohibiting the new party from logging shared portions of the transcript after the new party has been added to the instant messaging session.

4. The method of claim 1, further comprising issuing notice to the set of initial parties that only a portion of the transcript has been shared with the new party.

5. The method of claim 1, wherein sharing only a portion of the transcript in a transcript view for the new party, comprises sharing only a portion of the transcript in the transcript view for the new party as set forth in transcript sharing criteria established prior to rendering the transcript view by an inviting one of the set of initial parties.

6. The method of claim 1, wherein sharing only a portion of the transcript in a transcript view for the new party, comprises sharing only a portion of the transcript in a transcript view for the new party external to an instant messaging client for the new party.

7. The method of claim 1, wherein sharing only a portion of the transcript in a transcript view for the new party, comprises sharing only a portion of the transcript in a transcript view for the new party within an instant messaging client for the new party.

8. An instant messaging data processing system comprising:
   a computer with memory and at least one processor;
   an instant messaging server executing in the computer and configured for communicative coupling to a plurality of instant messaging clients over a computer communications network; and,
   transcript sharing logic coupled to at least one of the instant messaging server and the instant messaging clients, the logic comprising program code enabled to aggregating postings from initial parties to an instant messaging session into a transcript, to present in a user interface to the instant messaging session an add user dialog comprising controls selectable to determine whether or not to share the entire transcript or only a portion of the transcript with a newly added party to the instant messaging session, and to share only a portion of the transcript in a transcript view for a new party added to the instant messaging session if the controls are selected to share the portion of the transcript, but to share the entire portion of the transcript in the transcript view for the new party if the controls are selected to share the entire transcript.

9. The system of claim 8, wherein the program code is further enabled to limit an ability of the new party to log portions of the transcript after the new party has been added to the instant messaging session.

10. The system of claim 8, wherein the transcript sharing logic is disposed in the instant messaging server.

11. The system of claim 8, wherein the transcript sharing logic is disposed in each of the instant messaging clients.

12. A computer program product comprising a non-transitory computer usable storage medium embodying computer usable program code for instant messaging transcript sharing for added participants to an instant messaging session, the computer program product comprising:
   computer usable program code for establishing an instant messaging session as between a set of initial parties;
   computer usable program code for aggregating postings from the initial parties into a transcript;
   computer usable program code for presenting in a user interface to the instant messaging session an add user dialog comprising controls selectable to determine whether or not to share the entire transcript or only a portion of the transcript with a newly added party to the instant messaging session;
   computer usable program code for adding a new party to the instant messaging session; and,
   computer usable program code for sharing only a portion of the transcript in a transcript view for the new party if the controls are selected to share the portion of the transcript, and sharing the entire portion of the transcript in the transcript view for the new party if the controls are selected to share the entire transcript.

13. The computer program product of claim 12, further comprising computer usable program code for limiting an ability of the new party to log shared portions of the transcript after the new party has been added to the instant messaging session.

14. The computer program product of claim 12, further comprising computer usable program code for prohibiting the new party from logging shared portions of the transcript after the new party has been added to the instant messaging session.

15. The computer program product of claim 12, further comprising computer usable program code for issuing notice to the set of initial parties that only a portion of the transcript has been shared with the new party.

16. The computer program product of claim 12, wherein the computer usable program code for sharing only a portion of the transcript in a transcript view for the new party, comprises computer usable program code for sharing only a portion of the transcript in the transcript view for the new party as set forth in transcript sharing criteria established prior to rendering the transcript view by an inviting one of the set of initial parties.

17. The computer program product of claim 12, wherein the computer usable program code for sharing only a portion of the transcript in a transcript view for the new party, comprises computer usable program code for sharing only a portion of the transcript in a transcript view for the new party external to an instant messaging client for the new party.

18. The computer program product of claim 12, wherein the computer usable program code for sharing only a portion of the transcript in a transcript view for the new party, comprises computer usable program code for sharing only a portion of the transcript in a transcript view for the new party within an instant messaging client for the new party.

\* \* \* \* \*